United States Patent [19]

Nye

[11] 3,794,720

[45] Feb. 26, 1974

[54] PROCESS FOR PRODUCING HARD FERRITES

[75] Inventor: John David Nye, Prescott, Ontario, Canada

[73] Assignee: Ferrox Iron Ltd., Prescott, Ontario, Canada

[22] Filed: Mar. 31, 1972

[21] Appl. No.: 239,958

[52] U.S. Cl. .............................................. 423/594
[51] Int. Cl. ............................................. C01g 49/00
[58] Field of Search ..................................... 423/594

[56] References Cited
UNITED STATES PATENTS

| | | | |
|---|---|---|---|
| 2,904,395 | 9/1959 | Downs et al. | 423/594 |
| 2,502,130 | 3/1950 | Downs et al. | 423/594 X |
| 3,549,315 | 12/1970 | Lester et al. | 423/594 |
| 3,387,918 | 6/1968 | Moore et al. | 423/594 |
| 3,428,416 | 2/1969 | Gie et al. | 423/594 |
| 3,027,327 | 3/1962 | Blank | 423/594 |

Primary Examiner—Herbert T. Carter
Attorney, Agent, or Firm—Berman, Bishoff & Platt

[57] ABSTRACT

Barium, strontium or lead ferrite is produced in the usual manner by mixing together barium, strontium or lead carbonate and ferric oxide, calcining this to form the barium, strontium or lead ferrite and grinding the ferrite in slurry form in a mill to a particle size of about 1 micron average diameter. According to the invention, the barium, strontium or lead ferrite slurry before, during or after grinding in the mill has added thereto a reagent, which converts any barium, strontium or lead hydroxide present into a $CO_2$-inactive form. This prevents the hydroxide from cementing the ferrite particles together into an irreversible cement-like mass during drying and storage in the dry form.

8 Claims, No Drawings

PROCESS FOR PRODUCING HARD FERRITES

BACKGROUND OF THE INVENTION

1. Field of the Invention

This invention relates to the production of hard magnetic ferrites and in particular to the production of barium, strontium or lead ferrite which is pressed and sintered while in a finely divided state to produce a magnet.

2. Description of Prior Art

Magnetic ferrites are known to possess a crystalline structure and the distribution of the bivalent metal ions and ferrite metal ions in the available spaces among the oxygen atoms in the crystal lattice determines the magnetic properties of the ferrite.

The commonly practised method for the production of hard ferrite magnets is to first mill particles of a bivalent metal compound, such as barium carbonate, and ferric iron oxide together to a fine state of subdivision. Thereafter, a homogeneous mixture of milled particles in the stoichiometric amount required for barium ferrite with a controlled excess of barium carbonate, is prepared, and finally the mixture is calcined to transform the barium carbonate to barium oxide with concomitant in situ formation of barium ferrite, with a controlled excess of barium oxide. The calcined product is then milled to a fine state of subdivision to obtain barium ferrite in powdered form.

The above method has been practised for many years and more recently certain improved methods have been suggested. For example, in Erickson et al Canadian Patent 710,262, issued May 25, 1965, a process for preparing barium ferrite for permanent magnet production has been described in which an aqueous slurry of ferric oxide and barium hydroxide is prepared and carbon dioxide is introduced into the slurry to precipitate barium carbonate in a molecular state on the iron oxide particles in the slurry in at least the stoichiometric relationship required for the production of barium ferrite. This slurry is then calcined, milled, etc. in the usual manner to produce barium ferrite in powdered form.

Barium ferrite which is to be used for the production of magnets must be mechanically reduced to a very fine state of subdivision and will usually have a particle size of about 1 micron average diameter. This is usually achieved by introducing somewhat larger particles of barium ferrite into an attrition mill in the form of an about 50% by weight water slurry. The resultant slurry contains barium ferrite in a very fine suspension and it is the barium ferrite in this resultant slurry which is used to produce magnets.

Normally the slurry which is obtained is pumped into a settling tank where the barium ferrite is permitted to settle as a mud and the supernatent liquid, essentially water containing a small amount of barium hydroxide, is drained off. The barium ferrite mud can be discharged into barrels for shipment and used directly for the manufacture of oriented magnets or it can be dried to form a fine dry powder which can be either used directly for the manufacture of unoriented magnets or reslurried to form oriented magnets.

The shipping of the barium ferrite mud represents a major problem in that this must be shipped in heavy water-tight containers. Heavy steel barrels are normally used for this purpose. These are difficult to store and handle and are also expensive to ship partly because of the weight of the barrel itself, but also because of the fact that there is the additional weight of the water which remains in the mud. There are, therefore, very definite advantages in being able to ship the barium ferrite in the form of a dry powder since this can, for instance, be stored in cartons, bags, etc. which can be easily stored.

There is, however, one major problem in storing and shipping barium ferrite in the form of a fine dry powder. It has been found that this powder during drying and in storage tends to agglomerate into hard cement-like masses. It is believed that this cementing is caused by small amounts of barium hydroxide which remain in the barium ferrite and which comes into contact with carbon dioxide during drying and/or storage whereby the barium hydroxide is converted into insoluble barium carbonate. This barium carbonate tends to act as a cement which bonds together the particles of barium ferrite. The cement-like mass obtained becomes very difficult to handle and, for instance, it will not disperse when placed in water and must be crushed to powder form before it is used either in the wet or dry state. This additional step involves a major expense which makes the storing and shipping of barium ferrite in dry form commercially unattractive.

Moreover, the magnets obtained from the crushed cement-like mass have inferior characteristics as compared with those obtained directly from the ferrite mud.

It is, therefore, the object of the present invention to provide a process for producing hard magnetic ferrites in a dry form which can be readily reslurried and used for the production of high quality oriented magnets.

SUMMARY OF THE INVENTION

According to the process of the present invention, barium, strontium or lead carbonate and ferric oxide are calcined in the usual manner to produce the corresponding magnetic ferrite and this ferrite while in slurry form either before, during or after mechanical reduction has a reagent added thereto which converts any barium, strontium or lead hydroxide present in the slurry into a form which will not react with carbon dioxide. It has been found that when the barium, strontium or lead hydroxide has been converted into the $CO_2$—inactive form, it no longer acts as a binding agent which irreversibly cements the ferrite particles together in the dry form. The result of this is that the dry ferrite obtained according to this process can be taken from storage and directly formed into a slurry without any initial mechanical disintegration of the material.

This means that with the process of this invention, it is now possible to store and ship finely divided hard magnetic ferrites in a dry form without the previous disadvantage of this powder solidifying into an irreversible cement-like mass. Moreover, it has also surprisingly been found that the barium ferrite obtained according to this invention when reslurried results in magnets having superior characteristics in comparison to those obtained from previously known reslurried dry barium ferrite. It is believed that some of the magnetic properties are injured during the grinding of the prior art cement-like mass and this damage is avoided in the process of this invention so that when the barium ferrite obtained according to this invention is reslurried, it produces a magnet of equal quality to that obtained from the original ferrite mud before drying.

DESCRIPTION OF PREFERRED EMBODIMENTS

The barium, strontium or lead hydroxide can be converted into either a soluble or insoluble salt, provided that these salts will not react with the carbon dioxide in the air. For instance, carbon dioxide can be bubbled through the slurry to form the insoluble carbonate, oxalic acid can be added thereto to form the insoluble oxalate or acetic acid can be added to form the soluble acetate.

The ferrite slurry with the hydroxide inactivated with respect to carbon dioxide can be dried by a variety of known techniques, such as spray drying, Kiln drying and tray drying. The product emerging from the drier is usually in the form of loose agglomerates and these are usually broken down into small pieces by impact for ease of handling, e.g. in bags.

When the dry ferrite product in which the hydroxide has been converted to the insoluble salt is mixed with water for re-slurrying, it has been found that particles of ferrite tend to adhere together. It is believed that these particles are in the form of plate-like crystals which tend to hold together because of interfacial tensions. However, if the ferrite slurry prior to drying has a wetting agent added thereto, this wetting agent tends to coat the particles when dry so that when they are slurried in water, the water will penetrate between the crystal faces and separate the particles. Many different types of surfactants can be used for this purpose, a non-foaming type being particularly desirable.

This difficulty is not encountered with the soluble salt and the dry product readily re-slurries with water. However, the product containing the soluble salt will not readily break down into particulate form when dry so that it is only useful for the production oriented magnets.

EXAMPLE 1

Comparative tests were conducted to demonstrate the effectiveness of a carbon dioxide treatment of a barium ferrite slurry.

The barium ferrite slurry was prepared in the usual way and contained 56 percent solids and had a particle size of about 1 micron. It was divided into three portions.

a. The first portion was directly pressed into a compact in a magnetic field, for producing an anisotropic ceramic magnet (Compact A), b. The second portion was dried, then re-slurried in water into a 56 percent solid suspension. This slurry was then compacted in the same manner as (a) (Compact B), c. The third portion was neutralized by bubbling $CO_2$ through the suspension, which after neutralization, was then dried. The dry product was also re-slurried in water to form a 56 percent solid suspension and the suspension was then compacted in the same manner as (a) (Compact C).

Compacts A, B and C, all having been oriented, were transferred to a sintering kiln where they were sintered at a temperature of about 2,200°–2,450°F and for a time to produce magnets having a fired density of 5.0–5.1. Magnets A, B and C were obtained from compacts A, B and C respectively. They showed the following magnetic characteristics:

| Magnet | Remanence ($B_r$) | Coercive Force ($H_c$) | Energy Product $BH \times 10^6$ | Density |
|---|---|---|---|---|
| A | 4070 | 2800 | 3.7 | 5.13 |
| B | 3100 | 3000 | 2.0 | 5.00 |
| C | 4000 | 2850 | 3.7 | 5.10 |

From the above, it will be seen that $CO_2$ treatment of a barium ferrite slurry before drying and re-slurrying results in a final magnet which is equal in quality to that obtained from the original slurry, while the slurry which was merely dried and re-slurried gave very inferior results.

EXAMPLE 2

Another series of comparative tests were conducted, using oxalic acid to insolublize barium in a barium ferrite slurry. The slurry was prepared in the usual way and contained 56 percent solids at a particle size of about 1 micron. It was divided into three portions.

a. The first portion was directly pressed into a compact in a magnetic field for producing an anisotropic ceramic magnet (Compact A), b. The second portion was neutralized with oxalic acid, a slight excess being used, and this slurry was subsequently dried in an oven, re-slurried with water to 56 percent solids and compacts were made by pressing in a magnetic field in the usual manner (Compact B), c. To the third portion was added oxalic acid in slight excess for neutralization, together with a surface active agent (EMCOL CC–36: trademark of Witco Chemical Corp.) in sufficient quantity to cover the whole surface area of the barium ferrite with a layer of the agent. The slurry was then dried in an oven, subsequently re-slurried to a 56% solids suspension and pressed into compacts in a magnetic field (Compact C).

Compacts A, B and C, all having been oriented, were transferred to a sintering kiln where they were sintered at a temperature of about 2,200°–2,450°F and for a time to produce magnets having a fired density of about 5.0. Magnets A, B and C were obtained from compacts A, B and C, respectively, and they showed the following magnetic characteristics:

| Magnet | Remanence ($B_r$) | Coercive Force ($H_c$) | Energy Product $BH \times 10^6$ | Density |
|---|---|---|---|---|
| A | 4000 | 2800 | 3.6 | 5.10 |
| B | 3800 | 3000 | 3.3 | 5.00 |
| C | 3950 | 3000 | 3.7 | 5.08 |

While the characteristics of magnets B and C both very closely approach those of magnet A, which was made from the original slurry, it will be seen that the characteristics of magnet C are slightly superior to those of magnet B. This is explained by the fact that the presence of the surface active agent in portion (c) made re-slurrying even easier than for portion (b), which contained no surface active agent, with the resulting improved magnetic characteristics in magnet C.

EXAMPLE 3

A slurry was prepared containing 56 percent by weight of a doped barium ferrite of the type capable of giving what is known in the trade as "Ceramic 7" properties.

The slurry was divided into four portions.

a. The first portion was directly pressed into a compact in a magnetic field for producing an anisotropic ceramic magnet (Compact A).
b. The second portion was dried by heating in an oven, then re-slurried in water into a 56 percent solid suspension. The slurry was then compacted in the above manner (Compact B),
c. The third portion was neutralized by bubbling $CO_2$ through the suspension, which after neutralization, was then dried. The dry product was re-slurried in water to form a 56% solid suspension and the suspension was then compacted in the same manner as (a) (Compact C).
d. The fourth portion was neutralized with $CO_2$ in the above manner, after which a surface active agent was added in an amount sufficient to cover the available surface area with the surfactant. The slurry was then dried in an oven, subsequently re-slurried to a 56 percent solids suspension and pressed into compacts in a magnetic field (Compact D).

Compacts A, B, C and D, all having been oriented, were transferred to a sintering kiln where they were sintered at a temperature of about 2200°–2450°F and for a time to product magnets having a fired density of about 5.0. Magnets A, B, C and D were obtained from compacts A, B, C and D respectively, and they showed the following magnetic characteristics:

| Magnet | Remanence $(B_r)$ | Coercive Force $(H_c)$ | $H_{ic}$ | B-Hmax |
|---|---|---|---|---|
| A | 3450 | 3500 | 3650 | 2.9 |
| B | 2400 | 1900 | 3000 | 1.0 |
| C | 3250 | 3300 | 4000 | 2.6 |
| D | 3400 | 3500 | 4000 | 2.9 |

EXAMPLE 4

In order to demonstrate the effects of using a soluble salt of barium, a slurry of barium ferrite was prepared in the usual manner. This contained 56 percent solids.

The slurry was divided into three portions which were treated as follows:

a. The first portion was directly pressed into a compact in a magnetic field for producing an anisotropic ceramic magnet (Compact A).
b. The second portion was dried in an oven, then re-slurried in water into a 56 percent solid suspension. This slurry was then compacted in the same manner as (a) (Compact B),
c. The third portion was treated with an excess of acetic acid, oven dried and subsequently re-slurried in water to form a 56 percent solid suspension. The suspension was then compacted in the same manner as (a) (Compact C).

Compacts A, B and C, all having been oriented, were transferred to a sintering kiln where they were sintered at a temperature of about 2,200°–2,450°F and for a time to produce magnets having a fired density of about 5.0. Magnets A, B and C were thus obtained from compacts A, B and C respectively and showed the following magnetic characteristics.

| Magnet | Remanence $(B_r)$ | Coercive Force $(H_r)$ | Energy Product $BH \times 10^6$ |
|---|---|---|---|
| A | 3800 | 2800 | 3.4 |
| B | 3200 | 3000 | 2.1 |
| C | 3750 | 2200 | 3.4 |

I claim as my invention:

1. In a process for preparing hard magnetic ferrites in which a homogeneous mixture of ferric oxide particles and metallic carbonate particles selected from barium, strontium and lead carbonate is calcined to form a ferrite selected from barium, strontium and lead ferrites, the calcined product in the form of a slurry also containing some metallic hydroxide is mechanically reduced to obtain ferrite particles in finely divided form and the mechanically reduced slurry is dried to form a fine, dry ferrite powder, the improvement which comprises converting the metallic hydroxide in said slurry into a metallic salt which, after being dried to form a fine, dry powder, does not form a metallic carbonate in the presence of atmospheric carbon dioxide.

2. A process according to claim 1 wherein the hydroxide is converted into an insoluble salt.
3. A process according to claim 1 wherein the hydroxide is converted into a soluble salt.
4. A process according to claim 2 wherein $CO_2$ is passed into the slurry to form the insoluble salt.
5. A process according to claim 3 wherein acetic acid is added to the slurry to form the soluble salt.
6. A process according to claim 2 wherein the slurry has a surface active agent added thereto and the slurry containing surface active agent is dried.
7. A process according to claim 1 wherein the mechanically reduced slurry contains particles having an average diameter of about 1 micron.
8. A process according to claim 1 wherein the hydroxide is converted into the salt during mechanical reduction.

* * * * *